United States Patent [19]

Shaw

[11] Patent Number: 4,698,933

[45] Date of Patent: Oct. 13, 1987

[54] FISHING LINE RELEASE

[75] Inventor: Bryon Shaw, Davison, Mich.

[73] Assignee: Blue Water Research, Inc., Lapeer, Mich.

[21] Appl. No.: 896,522

[22] Filed: Aug. 14, 1986

[51] Int. Cl.$^4$ .............................................. A01K 97/00
[52] U.S. Cl. .................................... 43/43.12; 43/44.92
[58] Field of Search ................. 43/43.12, 44.88, 44.92, 43/27.4; 24/523, 525; 428/131; 280/193, 449

[56] References Cited

U.S. PATENT DOCUMENTS

| | | | |
|---|---|---|---|
| 1,999,613 | 4/1935 | Mueller | 24/523 |
| 2,170,594 | 8/1939 | Nicholson | 43/43.12 |
| 2,605,568 | 8/1952 | Riley | 43/43.12 |
| 2,749,649 | 6/1956 | Fitzsimmons | 43/43.12 |
| 2,958,973 | 11/1960 | Le May | 43/43.12 |
| 2,959,884 | 11/1960 | Le May | 43/43.12 |
| 3,026,646 | 3/1962 | Weaver | 43/43.12 |
| 3,083,992 | 4/1963 | Post | 43/43.12 |
| 3,357,126 | 12/1967 | Klieves | 43/43.12 |
| 3,500,575 | 3/1970 | Klemkowski | 43/43.12 |
| 3,766,681 | 10/1973 | Mander | 43/43.12 |

*Primary Examiner*—Kurt Rowan
*Attorney, Agent, or Firm*—Beaman & Beaman

[57] ABSTRACT

A fish line release consisting of a pair of elongated jaw members interconnected at one end and having free ends movable between open and closed positions biased toward the closed position by a spring. Resilient fish line engaging pads affixed to the free ends releasably retain a fishing line and alignment projections formed on the jaw members assure alignment of the fishing line with the pads when "loading" the release and also restrain the jaw member free ends from relative lateral displacement. The pads are attached to the jaw members by adhesive which is received within recesses which aid in interlocking and bonding the adhesive to the jaw members, and the jaw members include stops which prevent overstressing the spring when squeezing the jaw members to the open position.

8 Claims, 12 Drawing Figures

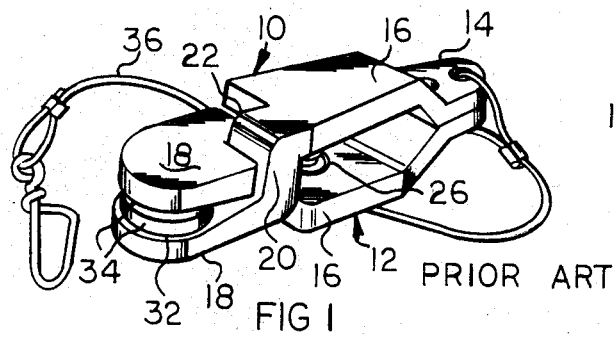
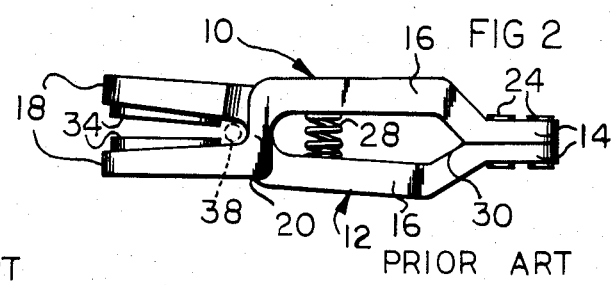
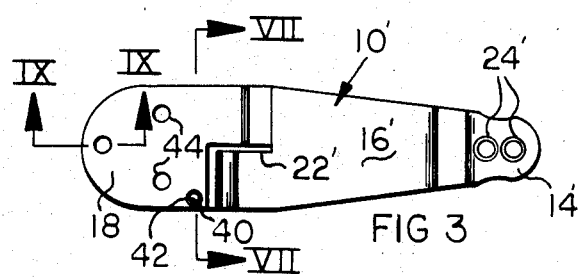
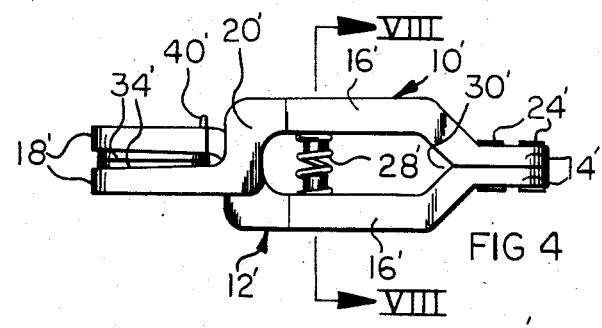
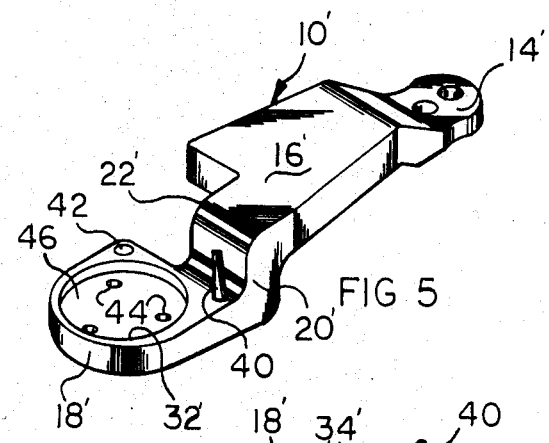
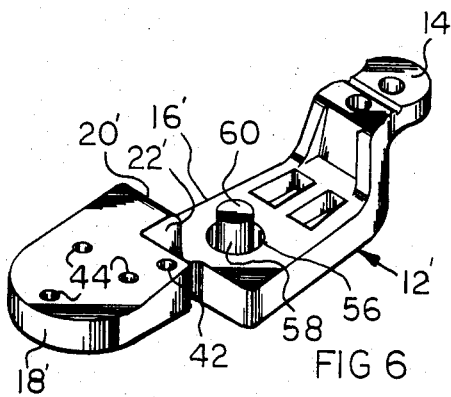
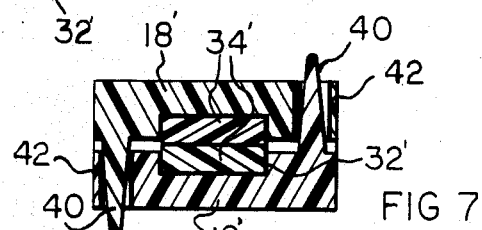
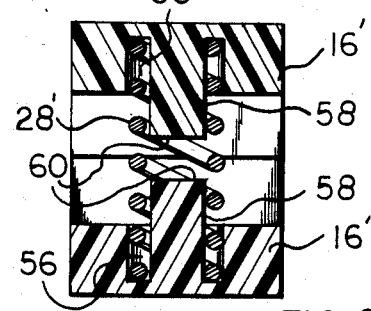
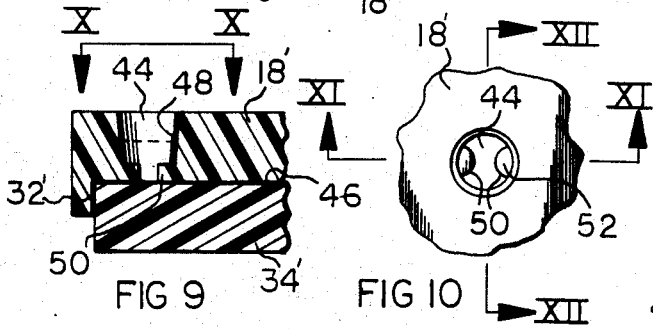
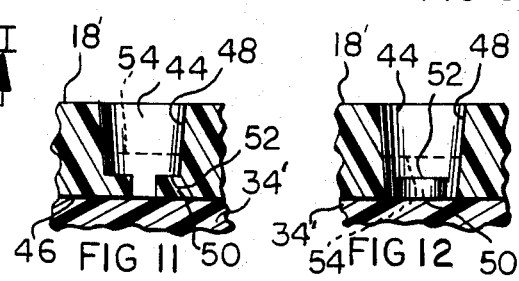

FISHING LINE RELEASE

BACKGROUND OF THE INVENTION

Fish line releases are used to hold a fish line at a location remote from the pole for the purpose of positioning the line and lure as desired. For instance, line releases are used to affix fish line to downrigger weights, commonly known as "cannonballs" to locate the bait at a particular depth while trolling, or releases may be used with outriggers which hold the line to the side of the fishing boat for clearance purposes.

Fish line releases utilize a variety of techniques for firmly holding the line, but permit the line to be released upon a predetermined tension being applied thereto when the lure is struck by a fish. The line is usually frictionally held within the release permitting the line to be pulled from the release upon the lure being struck.

The instant invention pertains to improvements in a jaw-type fish line release wherein biased jaw members include free ends on which resilient line engaging pads are located whereby the fish line may be frictionally held between the pads. The jaw members are biased toward a normal closed position by a compression spring, and preferably, the jaw members are formed of a non-corrosive synthetic plastic material and the line engaging pads are formed of a rubber or elastomeric material having high friction characteristics.

Fish line releases of the aforedescribed type have, heretofore, experienced several problems. For instance, the fish line must be accurately located between the pads while the jaw members are held in the open position. As the pads are relatively small, difficulty may be encountered in properly aligning the line on the pads, and misalignment will prevent the pads from properly holding the line and operating in the intended manner.

Also, as the jaw member free ends are remote from the location at which the jaw members are connected, lateral displacement between the free ends may occur which adversely affects the alignment of the line engaging pads.

Additionally, difficulty has been experienced in affixing the resilient pads to the synthetic plastic jaw members. The adhesives used for this purpose are, of course, submerged in water for a considerable length of time and bonding between the smooth jaw member material and pads is difficult to properly achieve, particularly if flat surfaces of the jaw members are engaged by the adhesive. Bonding failure is common producing the loss of a pad, and rendering the fish line release inoperative.

Another problem encountered with this type of line release is that the compression spring biasing the jaw members toward the normal closed position must be strong enough to adequately frictionally engage the pads with the line, but weak enough to permit manual operation so that "squeezing" of the jaw members permits them to be pivoted to the open position for loading. Such manual operation of the release may result in overcompression of the spring and thereby lowering the frictional grip of the release on the fish line permitting inadvertent line release.

It is an object of the invention to provide a fish line release of the pivoted jaw type wherein a guide for the fish line is defined on the jaw members to assure proper alignment of the fish line with the pads without requiring close attention by the fisherman.

Another object of the invention is to provide a jaw-type fish line release having synthetic plastic jaw members wherein the line engaging pads are adhesively bonded to the jaw members and an effective mechanical interconnection between the adhesive and the jaw members is produced.

A further object of the invention is to provide a jaw member type fish line release utilizing a compression spring biasing the release toward the closed position wherein means are associated with the compression spring for locating the spring on the jaw members and preventing overcompression thereof when pivoting the jaw members to the open position.

In the practice of the invention a pair of identical jaw member are molded of a synthetic plastic material. The jaw members are interconnected at one end by rivets, or other means, and each include a central region and a free end, the free ends being in opposed relationship. A resilient fish line engaging pad is adhesively bonded to the free end of each of the jaw members, and a compression spring interposed between the jaw members' central regions biases the central regions away from each other which causes the pads to engage and frictionally grip a fish line located therebetween.

Each of the jaw members is provided with an elongated projection adjacent the free end and located between the associated pad and jaw member central region which is slidably received within an opening in the other jaw member. These projections are so related to the associated pad as to function as a fish line guide when loading the release with the fish line assuring that the line will be aligned between the pads and thereby grasped by the pads as the release closes. The cooperation between the projections and their associated openings also permits the projections to function as restraints against relative lateral jaw member displacement transverse to the length of the projections.

The line engaging resilient pads are received within depressions defined in the jaw members and are held within these depressions by an adhesive. Small recesses intersect the jaw member depression surfaces into which the adhesive flows, and these recesses are defined by converging surfaces which converge toward the associated pad. Further, small projections are located within the recesses adjacent the intersection of the recesses with the jaw member depressions forming shoulders about which the freshly applied adhesive flows. Upon the adhesive hardening, the adhesive is locked within the jaw member recesses by the converging surfaces, and is also locked within the recesses by the shoulders of the projections producing a firm mechanical bond and connection between the adhesive and the jaw member, and thereby firmly bonding the pads to the associated jaw member.

Upon the inner surface of each of the jaw member central regions is located a stud, the studs being in opposed alignment with each other and a compression spring is placed upon the studs extending therebetween. The outer ends of the studs constitute abutment stops which engage as the jaw members are squeezed toward each other limiting the extent of jaw member displacement toward the open position, and preventing overstressing of the compression spring. The studs form the dual function of properly locating and retaining the compression spring on the jaw members as well as limiting movement of the jaw members toward each other.

BRIEF DESCRIPTION OF THE DRAWINGS

The aforementioned objects and advantages of the invention will be appreciated from the following description and accompanying drawings wherein:

FIG. 1 is a perspective view of a prior art fish line release over which the invention is an improvement, FIG. 2 is a side, elevational view of the prior art fish line release as shown in FIG. 1 shown in an open position, FIG. 3 is a top plan view of a fish line release in accord with the invention, FIG. 4 is a side, elevational view of a line release in accord with the invention in the closed position, FIG. 5 is a perspective view of the "top" jaw member as represented in FIG. 4, FIG. 6 is a perspective view of the "bottom" jaw member as represented in FIG. 4, FIG. 7 is an elevational, sectional view as taken along Section VII—VII of FIG. 3, FIG. 8 is an elevational, sectional view as taken along Section VIII—VIII of FIG. 4, FIG. 9 is an enlarged, detail, elevational, sectional view as taken along Section IX—IX of FIG. 3, FIG. 10 is an enlarged, detail, plan view as taken along Section X—X of FIG. 9, FIG. 11 is an enlarged, detail, elevational, sectional view as taken along Section XI—XI of FIG. 10, and FIG. 12 is an enlarged, elevational, sectional, detail view as taken along Section XII—XII of FIG. 10.

DESCRIPTION OF THE PREFERRED EMBODIMENT

FIGS. 1 and 2 illustrate the prior art fish line release manufactured by the assignee of this application over which the invention is an improvement.

With respect to FIGS. 1 and 2, the line release includes a pair of identical jaw members 10 and 12 molded of a synthetic plastic material such as acetal resin sold under the trademark Delrin made by DuPont Company, or Celcon made by Celanese Corporation.

The jaw members 10 and 12 each include an interconnected end 14, a central region 16, and a free end 18. As appreciated from the drawings, the configuration of the jaw members includes an offset portion 20 wherein the free end 18 of the "upper" jaw member 10 becomes the lower free end, while the free end of the "bottom" jaw member 12 becomes the upper free end 18. The jaw members are laterally relieved at 22, such that the jaw members will interlock and may be assembled in the disclosed manner wherein the free ends align.

The interconnected ends 14 are affixed to each other by a pair of tubular rivets 24 extending through holes formed in the ends, and recesses 26 are defined in the inner surface of the central regions 16 for receiving the compression spring 28. The compression spring 28 biases the central regions 16 away from each other, which moves the free ends 18 toward each other. The resilient characteristic of the material of which the jaw members are formed permits the necessary deformation of the jaw members which substantially hinge about the location 30, FIG. 2.

Each of the jaw member free ends 18 is provided with a circular depression 32 in which is located a resilient line engaging pad 34. The pad 34 is of a firm rubber-like material having high friction characteristics, and the pads are mounted within their associated depression 32 by a water-resistant adhesive or glue. The depressions are formed with flat blind surfaces which engage the flat surfaces of the pads, and adhesion occurs from the bonding of the adhesive to the flat surfaces of the jaw member depression and the associated pad.

By "squeezing" the jaw member central regions 16 toward each other with the fingers, the free ends 18 will open permitting a fish line to be inserted between the pads 34, and upon release of the jaw members, the spring 28 will "close" the free ends together causing the pads to frictionally engage the fish line therebetween. A wire cable 36 is affixed to the interconnected ends 14 of the jaw members wherein the release may be attached to a downrigger weight, and the release will thereby position the lure at the desired depth. Upon a fish striking the lure, the fish line will be pulled from between the pads 34, and the fish line is then retrieved upon the reel of the pole, not shown.

Several deficiencies exist with the fish line release shown in FIGS. 1 and 2. For instance, difficulty is often encountered in aligning the fish line with the pads 34 when loading the release. If the fisherman does not take sufficient care, the fish line, represented at 38 in FIG. 2, may be inserted past the pads 34 and upon closing of the jaw members, the fish line will be trapped between the pads and offset portions 20 rather than between the pads themselves. Additionally, the adhesion of the adhesive to the smooth flat surfaces of the jaw members may fail permitting the pads to separate from their associated depression, rendering the release unusable. Because of the difficulty in producing a bond between the synthetic plastic material of the jaw member and the adhesive, considerable difficulty has been encountered in achieving an effective bonding between the adhesive and the jaw member material.

A third problem that has arisen in the prior art line release relates to the possibility of overcompressing the spring 28 when the jaw members are squeezed to open the free ends 18 for loading. Particularly, with a relatively light compression spring, the jaw members may be biased toward each other until the central regions 16 thereof engage which will overcompress the spring 28 reducing its ability to firmly close the free ends and adequately grip the fish line.

The aforementioned disadvantages of the prior art device have been overcome by the fish line release structure shown in FIGS. 3–12. In these figures structure similar to that previously described is indicated by primed reference numerals, and the following description will be primarily directed to the improvement features.

Each of the jaw members 10' and 12' is provided with a homogeneous guide projection 40 which is located adjacent the pad depression 32', and interposed between the pad depression and the associated jaw member offset portion 20'. The projections 40 are of a tapered configuration, and are so located on the jaw member free end as to be closer to the outermost portion of the free end 18' than the innermost portion of the depressions 32' and pads 34'. This relationship will be appreciated from FIGS. 4 and 7.

Each of the jaw members 10' and 12' is also provided with a guide projection receiving opening 42 of a elongated form which passes through the thickness of the associated free end 18'. Upon assembly of the jaw members as shown in FIGS. 3 and 4, the projections 40 are relatively closely received within the openings 42 for movement therein. When the jaw members are opened to their fullest extent, the projections 40 still remain partially received within their associated opening 42, and in this manner, the projections 40 serve as line guides to prevent the fish line from being inserted between the jaw member free ends past the pads 34' to the extent shown in FIG. 2. The fisherman will open the jaw members and place the fish line between pads 34' and even when the line is inserted its maximum extent between the pads so as to engage the projections 40, the line will remain in alignment with the pads 34', and cannot be received between the pads and the offset portions 20' as shown in FIG. 2.

In addition to assuring alignment of the fish line with the pads 34', the projections 40 also, because of their association with the openings 42 of the other jaw member, produce an interconnection between the jaw member free ends 18' which resist lateral relative displacement of the jaw members in a direction transverse to the length of the projections. Thus, the line guide projections 40 add a structural rigidity to the line release that was not heretofore present.

To improve the adhesion of the pads 34' within the jaw member depressions 32', three adhesive or glue-receiving anchor recesses 44 are formed in each jaw member free end intersecting the associated depression flat base surface 46. The recesses 44 are of a generally conical configuration having a converging wall 48 which converges toward the associated pad 34', FIGS. 9, 11 and 12.

The recesses 44 intersect the surfaces 46, and a pair of tabs 50 are defined in the recesses at the intersection with the surface 46 in diametrically opposed relationship. The tabs 50 each include a shoulder surface 52, FIG. 11, which is substantially parallel to the associated surface 46, and spaced therefrom. Thus, upon an adhesive being placed on the pads 34' prior to being located in their associated depression 34', or the adhesive may be directly placed within the depression prior to insertion of the pad, the adhesive will enter the recesses 44 between the tabs 50 and engage the shoulder surfaces 52 and the convergent sides 48 of the recesses. The adhesive is shown in dotted lines at 54 in FIGS. 11 and 12. Upon the adhesive hardening, a firm mechanical interconnection between the adhesive and the recesses 44 and tabs 50 is produced which forms a much stronger interconnection between the pads and jaw members than previously attainable. The adhesive 54 bonds well to the pads 34', and the use of the recesses 44 has significantly improved the retention of the pads within the jaw members.

The stop structure associated with the compression spring 28' is best appreciated from FIGS. 6 and 8. Each of the jaw members 10' and 12' is provided with an annular recess 56 intersecting the central region inner surface, and a stud 58 extends from the recess 56 having a squared stop abutment end 60. The compression spring 28' is located upon the studs 58 within the recesses 56, as apparent from FIG. 8, and as the stop abutment end surfaces 60 are in opposed relationship, it will be appreciated that the ends 60 will engage upon the jaw member central regions 16' being squeezed together sufficiently. The separation between the end surfaces 60 at the "closed" position of FIG. 4 is sufficient to permit the jaw members to be sufficiently "opened" to load the fish line between the pads 34', but the ends 60 will engage prior to the spring 28' being overstressed, and the studs 58 will protect even light springs from damage.

It will be appreciated that the above improvements to the prior art line release overcome problems previously encountered, and it is appreciated that various modifications to the invention may be apparent to those skilled in the art without departing from the spirit and scope of the invention.

I claim:

1. In a fish line release consisting of first and second jaw members positionable between open and closed positions, each jaw member including an interconnected end, a central region and a free end, means connecting the jaw members together at their interconnected ends, spring means biasing the jaw member's free ends toward each other toward the closed position, a fish line engaging pad mounted upon each jaw member located between the free end and the central region thereof having an outer region located adjacent the associated jaw member free end and an inner region located adjacent the associated jaw member central region, the pads of the jaw members engaging at the closed position, the improvement comprising fish line positioning means interposed between the jaw members located adjacent the pad's inner regions positioning a fishing line inserted between the pads in alignment with the pads to insure engagement of the pads with the fish line when the jaw members are in the closed position.

2. In a fish line release as in claim 1, said fish line positioning means comprising a pair of elongated spaced projections.

3. In a fish line release as in claim 2, one of said projections being defined on the first jaw member and the other projection being defined on the second jaw member, a first opening defined in the second jaw member receiving said one projection, and a second opening defined in the first jaw member receiving said other projection.

4. In a fish line release as in claim 3, said projections being closely received within their associated opening whereby said projections restrain the jaw member's free ends from relative lateral displacement in a direction transverse to the length of said projections.

5. In a fish line release as in claim 1, the spring means biasing the jaw members free ends toward each other comprising a compression spring interposed between the jaw member's central regions, a stud defined upon each jaw member central region having an outer end defining an abutment, said studs being in opposed alignment with each other wherein said stud abutment ends engage when the jaw members are positioned to the fully open position, said compression spring being disposed about said studs.

6. In a fish line release consisting of first and second jaw members positionable between open and closed positions, each jaw member including an interconnected end, a central region and a free end, means connecting the jaw members together at their interconnected ends, spring means biasing the jaw member's free ends toward each other toward the closed position, a flat pad engaging surface defined upon each jaw member free end, a resilient fish line engaging pad engaging the pad engaging surface of each jaw member, and an adhesive adhering the pads to their associated pad engaging surface, the improvement comprising, a plurality of recesses defined in each jaw member intersecting the pad engaging surface thereof, said recesses being defined by wall surfaces converging in the direction toward the associated pad whereby adhesive entering said recesses expands within said recesses to lock the adhesive therein.

7. In a fish line release as in claim 6, at least one tab defined in said recesses adjacent the intersection of said recesses with the associated pad engaging surface having an abutment shoulder facing away from said intersection for receiving adhesive and augmenting the retention of the adhesive within said recesses.

8. In a fish line release as in claim 7, a pair of tabs defined in each of said recesses.

* * * * *